US008233842B2

(12) United States Patent
Symons

(10) Patent No.: US 8,233,842 B2
(45) Date of Patent: Jul. 31, 2012

(54) COMMUNICATION DEVICES HAVING CONTROLLED IMPEDANCES

(75) Inventor: Peter Symons, Wokingham (GB)

(73) Assignee: Innovision Research & Technology PLC (GB)

(*) Notice: Subject to any disclaimer, the term of this patent is extended or adjusted under 35 U.S.C. 154(b) by 0 days.

(21) Appl. No.: 13/017,794

(22) Filed: Jan. 31, 2011

(65) Prior Publication Data
US 2011/0189953 A1 Aug. 4, 2011

Related U.S. Application Data

(63) Continuation of application No. 11/886,498, filed as application No. PCT/GB2006/000855 on Mar. 10, 2006, now Pat. No. 7,881,665.

(30) Foreign Application Priority Data

Mar. 11, 2005 (GB) .................................. 0505060.4

(51) Int. Cl.
H04B 5/00 (2006.01)
(52) U.S. Cl. ...................................................... 455/41.1
(58) Field of Classification Search .................. 455/41.1, 455/41.2, 41.3, 107, 248.1, 80, 129, 289, 455/338, 550.1, 24, 69, 126, 292; 340/10.1, 340/572.1, 854.6, 854.8
See application file for complete search history.

(56) References Cited

U.S. PATENT DOCUMENTS

| 6,317,027 | B1 | 11/2001 | Watkins |
| 6,650,227 | B1 | 11/2003 | Bradin |
| 7,881,665 | B2 | 2/2011 | Symons |
| 2002/0140500 | A1 | 10/2002 | Beigel et al. |
| 2003/0057279 | A1 | 3/2003 | Uozumi et al. |
| 2004/0061640 | A1 | 4/2004 | Cornic et al. |
| 2004/0203361 | A1 | 10/2004 | Belcher et al. |

FOREIGN PATENT DOCUMENTS

| GB | 2 391 315 A | 2/2004 |
| JP | 07-225251 A | 8/1995 |
| JP | 2003-281492 A | 10/2003 |
| JP | 2004-287968 A | 10/2004 |

(Continued)

OTHER PUBLICATIONS

Office Action from corresponding European Application 06 726 358, dated Jun. 30, 2008.

(Continued)

Primary Examiner — Eugene Yun
(74) Attorney, Agent, or Firm — Sterne, Kessler, Goldstein & Fox P.L.L.C.

(57) ABSTRACT

A NFC communicator or NFC communications enabled device has a data store to store data, an inductive coupler to couple inductively with the magnetic field of a radio frequency signal and a signal supplier to supply a radio frequency signal to the inductive coupler. A modulator is provided to modulate a radio frequency signal in accordance with data and a demodulator is provided to extract data from a modulated radio frequency signal inductively coupled to the coupler A controller enables the NFC communicator or NFC communications enabled device both to initiate near field radio frequency communication with another near field RF communicator and to respond to near field radio frequency communication initiated by another near field RF communicator. The inductive coupler has an antenna and a variable impedance element and the controller is operable to control the variable impedance element to control a magnetic field strength associated with a radio frequency signal supplied by the signal supplier.

37 Claims, 6 Drawing Sheets

FOREIGN PATENT DOCUMENTS

| | | |
|---|---|---|
| WO | WO 99/39450 A1 | 8/1999 |
| WO | WO 2004/093249 A1 | 10/2004 |
| WO | WO 2004/098089 A1 | 11/2004 |
| WO | WO 2005/045755 A2 | 5/2005 |
| WO | WO 2005/050530 A2 | 6/2005 |
| WO | WO 2005/074402 A2 | 8/2005 |
| WO | WO 2006/054070 A1 | 5/2006 |

OTHER PUBLICATIONS

English Lanuage Abstract of Japanese Patent Publication No. JP 07-225251 A, published Aug. 22, 1995, Japanese Patent Office, Patent & Utility Model Gazette DB; 1 page.

English Language Abstract of Japanese Patent Publication No. JP 2003-281492 A, published Mar. 10, 2003, Japanese Patent Office, Patent & Utility Model Gazette DB; 1 page.

English Language Abstract of Japanese Patent Publication No. JP 2004-287968 A, published Oct. 14, 2004, Japanese Patent Office, Patent & Utility Model Gazette DB; 1 page.

Great Britain Search Report dated Jan. 30, 2006 corresponding to Great Britain 0520260.1 filed Oct. 5, 2005, The Patent Office, United Kingdom.

International Search Report directed to related International application No. PCT/GB2005/004407, mailed on Feb. 22, 2006, European Patent Office, Rijswijk, Netherlands; 2 pages.

European Search Report for EP Application No. EP 10 18 1523, Munich, Germany, search completed on Nov. 4, 2011.

COMMUNICATION DEVICES HAVING CONTROLLED IMPEDANCES

The present application is a continuation of U.S. patent application Ser. No. 11/886,498, filed on Sep. 6, 2007, which is a National Stage Entry of PCT/GB2006/000855, filed on Mar. 10, 2006, each of which is incorporated herein by reference in its entirety.

This invention relates to NFC communicators and devices comprising NFC communicators.

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

Near field communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. Hence NFC communicators can act as both RFID transceivers and RFID transponders and are able to communicate with other NFC communicators, RFID transceivers and RFID transponders. The term "near field RF communicator" includes not only NFC communicators but also initiating near field RF communicators such as RFID transceivers or readers that are capable of initiating a near field RF communication but not responding to initiation of a near field RF communication by another near field RF communicator and responding near field RF communicators such as RFID transponders or tags that are capable of responding to initiation of a near field RF communication by another near field RF communicator but not of initiating a near field RF communication with another near field RF communicator.

Examples of near field RF communicators are defined in various standards for example ISO/IEC 18092 and ISO/IEC 21481 for NFC communicators, and ISO/IEC 14443 and ISO/IEC 15693 for near field RF communicators.

NFC communicators may be provided as standalone or discrete devices or may be incorporated within or coupled to or otherwise associated with larger electrical devices or host devices (referred to below as NFC communications enabled devices) to enable those devices to communicate by the near field with other near field RF communicators or devices incorporating or coupled to such near field RF communicators. When incorporated within a larger device or host, an NFC communicator may be a discrete entity or may be provided by functionality within the larger device or host. Examples of such larger devices or host devices are, for example, cellular telephone devices, portable computing devices (such as personal digital assistants, notebooks, laptops), other computing devices such as personal or desk top computers, computer peripherals such as printers, or other electrical devices such as portable audio and/or video players such as MP3 players, IPODs®, CD players, DVD players. Other examples of such larger devices or host devices are other electrical or electronic products, for example consumer products such as domestic appliance or personal care products, and other electrical or electronic devices, apparatus or systems. Some areas of application are payment systems, ticketing systems, for example in tickets (for example parking tickets, bus tickets, train tickets or entrance permits or tickets) or in ticket checking systems, toys, games, posters, packaging, advertising material, product inventory checking systems and so on.

NFC communicators generally need to achieve a pre-determined communications range. The magnetic environment experienced by an NFC communicator will affect the strength of the inductive coupling between NFC communicators and thus the range over which the NFC communicator can operate. This magnetic environment may vary depending upon the application for which the NFC communicator is intended, for example depending upon the location in which the NFC communicator is intended to operate and the magnetic environment provided by any host device, which will in turn be dependent upon the magnetic characteristics of that particular host device so that different host devices may have different effects on the communications range of the NFC communicator. Achieving the required communications range for a particular application may therefore require adjustment of the antenna circuit of the NFC communicator to compensate for the magnetic environment in which the NFC communicator is intended to be used so as to maximise the communications range. This usually requires adjustment of impedances within the inductive coupler to fine-tune the inductive coupler where the inductive coupler is a tuned antenna circuit or to null-out impedance effects in the inductive coupler where the inductive coupler is a non-tuned antenna circuit.

Where an impedance is an integrated component, that is a component forming part of an integrated circuit providing at least part of the functionality of the NFC communicator, then that component is usually a fixed-value component whose value can generally only be adjusted during manufacture of the integrated circuit, normally requiring alteration of the metal mask of the integrated circuit. This may mean that a different metal mask will be required for NFC communicators to be used in different applications so as to adjust the antenna circuit for the magnetic environment that the NFC communicators will experience in those applications. Another way to adjust the antenna circuit impedance is to add impedance components externally of the integrated circuit. Although providing such external impedance components avoids the need for mask alteration, providing external components increases the complexity of the manufacturing process and still requires selection of the actual values of the external component to fit the NFC communicator for the magnetic environment in which it is designed to operate.

The carrying out of either of the above impedance component value adjustments separately for different batches of the same NFC communicator where those batches are intended for different applications and/or for use in different host devices, increases costs and to some extent obviates the advantages of using the same NFC communicator for those different applications and/or different host devices.

In one aspect, the present invention provides an NFC communicator wherein the value of at least one impedance component of an inductive coupler or antenna circuit is variable.

In one aspect, the present invention provides an NFC communicator wherein the value of at least one impedance component of an inductive coupler or antenna circuit is electronically controllable.

In one aspect, the present invention provides an NFC communicator having an impedance that can be varied over a range without adding unwanted impedance change effects.

In one aspect, the present invention provides an NFC communicator having an inductive coupler or antenna circuit including a least one gain-controlled impedance element. The gain-controlled impedance element may comprise a amplifier having its gain controlled by a controller of the NFC communicator. The gain may be controlled in any known manner, for example by controlling the amount of feedback within an amplifier.

An embodiment of the present invention provides an NFC communicator having an inductive coupler or antenna circuit including at least one gain-controlled impedance element that facilitates adjustment of the impedance of the inductive coupler to adjust the NFC communicator to the magnetic environment within which it is to operate without the need to change a mask stage of an integrated circuit manufacturing process or to select external component values to achieve the adjustment.

An embodiment of the present invention provides an NFC communicator having at least one gain-controlled impedance element, for example having a gain-controlled impedance element in at least one of: an inductive coupler; a modulator; a demodulator; or a power provider of the NFC communicator.

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The NFC communicator may be provided wholly or partially as an integrated circuit or collections of integrated circuits.

Figure 1:
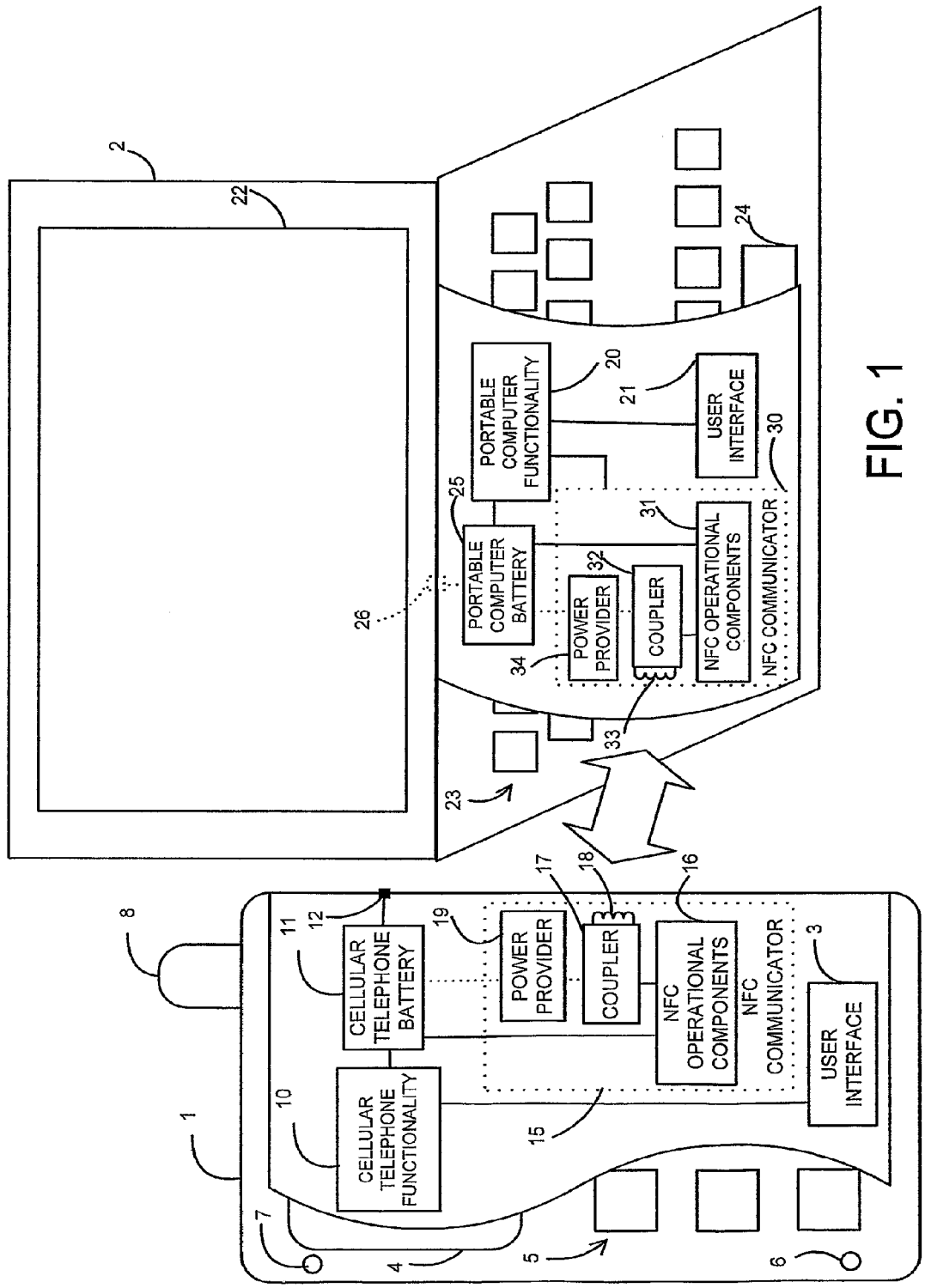
FIG. 1 shows a representational diagram illustrating communication between two NFC communications enabled devices.

Referring now specifically to FIG. 1, there is shown a representational diagram illustrating communication between two NFC communications enabled devices. In FIG. 1 the representations of the NFC communications enabled devices have been show partly cut-away and the functionality provided by the NFC communications enabled devices illustrated by way of a functional block diagram within the NFC communications enabled device.

As shown in FIG. 1, one NFC communications enabled device comprises a cellular telephone device 1 and the other NFC communications enabled device comprises a portable computer 2 such as a notebook or laptop computer.

The cellular telephone device 1 has the usual features of a cellular telephone including cellular telephone functionality 10 (in the form of, usually, a programmed controller, generally a processor or microprocessor with associated memory or data storage, for controlling operation of the cellular telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The cellular telephone device also has a chargeable battery 11 coupled to a charging socket 12 via which a mains adapter (not shown) may be connected to enable charging of the battery 11. The cellular telephone device 1 may have an alternative or additional power supply (not shown), for example a reserve battery or emergency battery. The cellular telephone device may be a standalone cellular telephone (mobile telephone or cellphone) or may comprise a device such as a computer, for example a notebook, laptop or PDA, having cellular telephone functionality.

Similarly, the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an inductive coupler 17 and 32 comprising an inductor or coil in the form of an antenna 18 and 33. The inductive couplers 17 and 32 enable an alternating magnetic field (H field) generated by the antenna 18 (or 33) of one near field communicator 15 (or 30) by transmission of an RF signal (for example a 13.56 Mega Hertz signal) to be inductively coupled to the antenna 33 (or 18) of the other near field communicator 30 (or 15) when that antenna is within the near field of the RF signal generated by the one near field communicator 15 (or 30).

The NFC communicators 15 and 30 are coupled to the cellular telephone device and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively.

Each of the NFC communicators 15 and 30 has a power provider 19 and 34. The power providers 19 and 34 may be, for example, batteries such as button cell or other small batteries. Alternatively or additionally, as shown by the dashed lines in FIG. 1, the power providers 19 and 34 may comprise couplings to the host batteries 11 and 25 and/or may be coupled to derive power from an RF signal inductively coupled to the NFC communicator.

It will be appreciated that FIG. 1 shows only examples of types of host devices. Other examples of such host devices are, for example, personal digital assistants, notebooks, other computing devices such as personal or desk top computers, computer peripherals such as printers, or other electrical devices such as portable audio and/or video players such as MP3 players, IPODs®, CD players, DVD players. Further examples of such larger devices or host devices are other electrical or electronic products, for example consumer products such as domestic appliance or personal care products, and other electrical or electronic devices, apparatus or systems. Some areas of application are payment systems, ticketing systems, for example in tickets (for example parking tickets, bus tickets, train tickets or entrance permits or tickets) or in ticket checking systems, toys, games, posters, packaging, advertising material, product inventory checking systems and so on.

Also, rather than being incorporated within the host device, the NFC communicator 15 or 30 may be associated with the host device, for example by a wired or wireless coupling that is capable of power transfer. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or an other device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

As another possibility, one or both of the NFC communications enabled devices may be a standalone NFC communicator, that is it may have no functionality beyond its NFC communications functionality. Also, one of the devices may be a near field RF communicator other than an NFC communicator.

Figure 2:
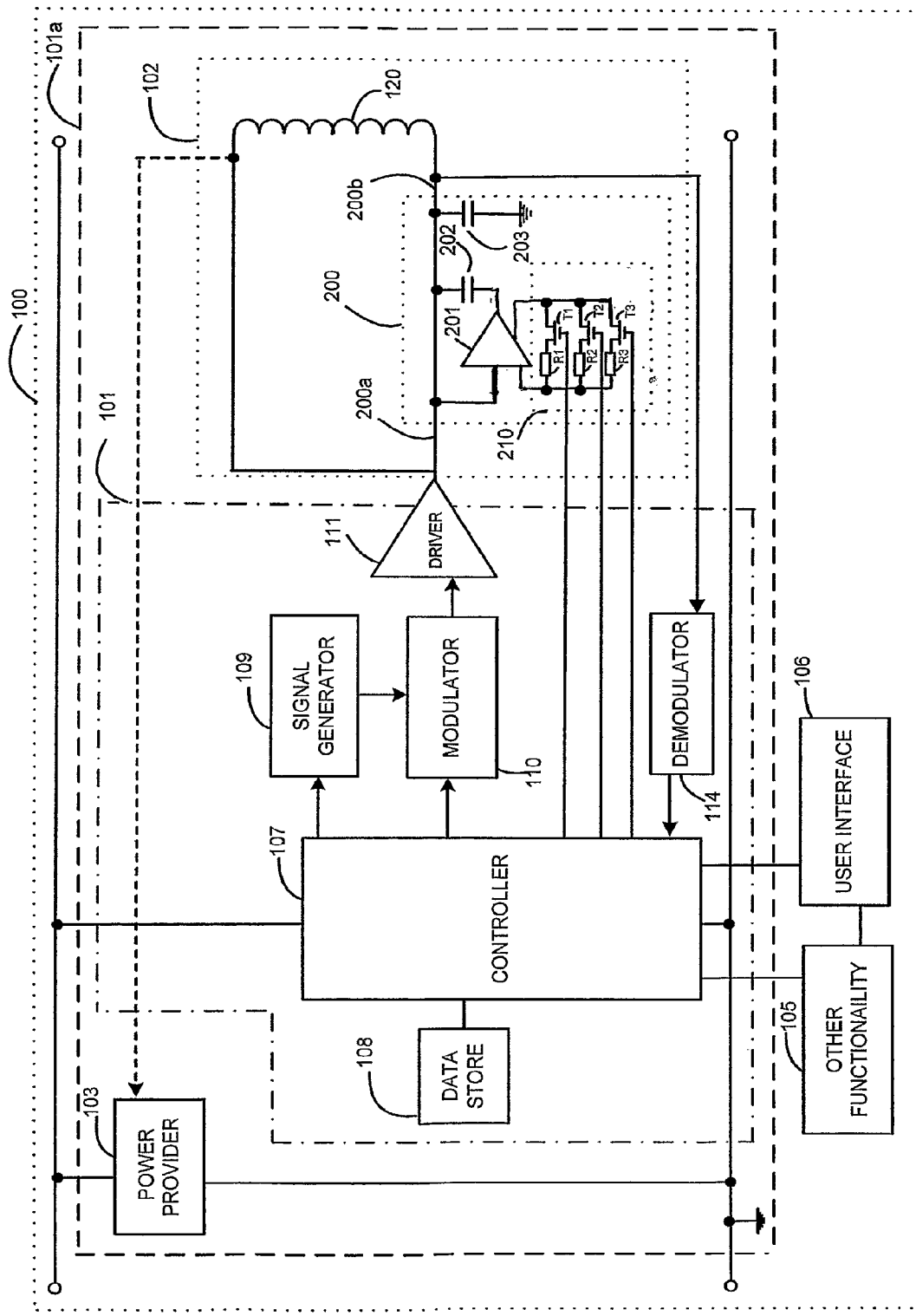
FIG. 2 shows a functional block diagram of a first example of an NFC communications enabled device embodying the invention having a coupler with a gain-controlled impedance element.

FIG. 2 shows a functional block diagram of an NFC communications enabled device 100 in accordance with the invention.

The NFC communications enabled device 100 comprises an NFC communicator 101a having NFC operational components 101, a power provider 103 and an inductive coupler or antenna circuit 102.

The NFC communications enabled device 100 may or may not also have or be capable of being connected or coupled with at least one of other functionality 105 (for example functionality of a host device such as described above) and a user interface 106.

The NFC operational components 101 comprise a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store 108.

The NFC operational components 101 also comprise a demodulator 114 coupled between the inductive coupler 102 and the controller 107 for demodulating a modulated RF signal inductively coupled to the inductive coupler 102 from another near field RF communicator in near field range and for supplying the thus extracted data to the controller 107 for processing.

In addition the NFC operational components 101 include an RF signal generator 109 for generating an RE signal to be supplied to the inductive coupler 102 via a driver 111 to enable an RF signal to be transmitted by the NFC communications enabled device.

As shown in FIG. 2, the RF signal generator 109 is coupled to the driver 111 via a modulator 110 operable to modulate the RF signal with data supplied by the controller 107 to enable data to be communicated to another near field RF communicator in near field range of the NFC communicator 101a. Any suitable form of modulation scheme may be used for communication, for example FSK (Frequency Shift Key) modulation, PSK (Phase Shift Key) modulation, PDM (Pulse Density Modulation), amplitude modulation, or load modulation.

In the example shown in FIG. 2, the inductive coupler 102 comprises a series tuned antenna circuit comprising an antenna coil 120 in series with a gain-controlled impedance element 200 having an input 200a and an output 200b. The input 200a of the gain-controlled impedance element 200 is coupled to an input of an amplifier 201 having a near infinite input impedance and a near zero output impedance. The input of the amplifier 201 is coupled to earth (ground) via a capacitor 203 and the output of the amplifier 201 is coupled to the output 200b of the gain-controlled impedance 200 via a capacitor 202 and to earth (ground) via the series connection of the capacitors 202 and 203.

In this example, negative feedback around the amplifier 201 is used to control the gain of the amplifier 201. As shown in FIG. 2, the negative feedback comprises a variable feedback element 210 in the form of a variable resistance element comprising a series (three are shown although there may be more or fewer) of resistors R1 to R3 each connectable between the input and input of the amplifier 201 via a corresponding switch T1, T2 and T3. As shown, the switches T1, T2 and T3 are Field Effect Transistors having their control electrodes coupled to corresponding control outputs of the controller 107. Other forms of semiconductor switches may however be used.

Figure 5:
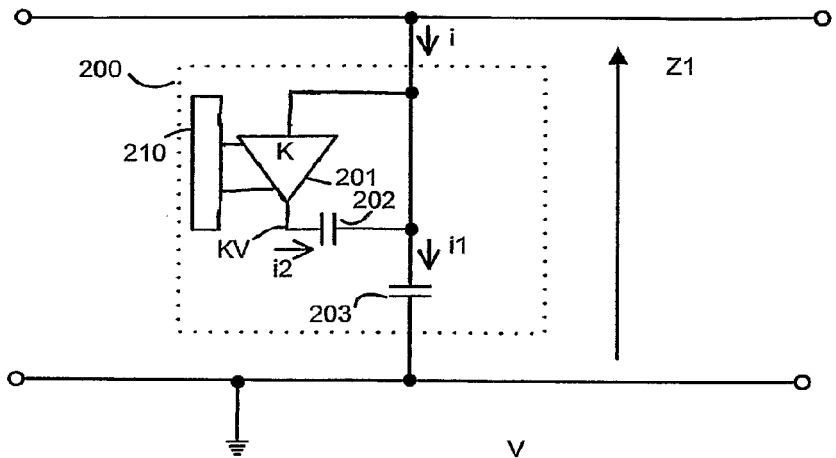
FIG. 5 shows a circuit diagram for explaining operation of the gain-controlled impedance element shown in FIG. 2.

The operation of the gain-controlled impedance element 200 shown in FIG. 2 will now be described with the aid of the circuit diagram shown in FIG. 5 in which V is the alternating voltage across the gain-controlled impedance element 200, i is the alternating current supplied to the gain-controlled impedance element 200, K is the gain of the amplifier 201, Z1 is the effective impedance of the gain-controlled impedance element 200 and the capacitances of the capacitors 202 and 203 are C2 and C1, respectively.

Applying Kirchoff's current law:

$$i + i2 = i1 \quad (1)$$

where i2 is the current supplied by the near zero impedance output of the amplifier 201 and i1 is the current through the capacitor 203

From Kirchoff's voltage law:

$$i1 = V/(1/j\omega C1) = Vj\omega C1 \quad (2)$$

the alternating voltage across the capacitor 202 is given by:

$$KV - V = i2(1/j\omega C2) \quad (3)$$

which reduces to:

$$(K-1)V = i2/j\omega C2 \quad (4)$$

so:

$$i2 = (K-1)Vj\omega C2 \quad (5)$$

and therefore from equations 1, 2 and 5:

$$i + (K-1)Vj\omega C2 = Vj\omega C1 \quad (6)$$

giving:

$$i = Vj\omega C1 - (K-1)Vj\omega C2 \quad (7)$$

The impedance Z1 of the gain-controlled impedance element 200 is:

$$Z1 = V/i = 1/(j\omega C1 - (K-1)j\omega C2) \quad (8)$$

which reduces to:

$$Z1 = 1/j\omega(C1 - (K-1)C2) \quad (9)$$

Equation 9 shows that the impedance of the gain-controlled impedance Z1 is purely capacitive with a value:

$$C1 - (K-1)C2 \quad (10)$$

Thus, the effective capacitance Z1 of the gain-controlled impedance element 200 is controlled by the gain K of the amplifier which in turn is controlled by the variable feedback element 210 which is controlled by the controller 107. Whether the effective capacitance is greater than or less than the capacitance $C_1$ of capacitor 203 will depend upon whether K is less than or greater than 1.

In this example, the gain of the amplifier is set for the particular application for which the NFC communicator is to be used and for its expected magnetic environment by configuration of the controller 107 to select which of the switches T1 to T3 is to be closed during operation of the NFC communicator. The determination of the required gain for a particular application and magnetic environment may be achieved by testing the strength of the RF signal generated by a sample NFC communicator designed for that application within an environment that is the same as or mimics the environment within which the NFC communicator is to operate and controlling the controller 107 of the sample NFC communicator to adjust the gain by controlling the switches T1 to T3 until the required RF signal strength is achieved. This enables the gain to be set relatively easily even for an NFC communicator that forms part of a host device, whether the NFC communicator is a discrete entity within the host device or is provided integrated in the functionality of the host device. The gain may be set during manufacture or during operation of the device.

As will be appreciated, the provision of the gain-controlled impedance element 200 in the inductive coupler or antenna circuit 102 enables the NFC communicator to be adapted to the magnetic environment within which it is to operate so as to obtain the required RF signal strength without the need to change a mask stage of an integrated circuit manufacturing process, or to add external components or to select different value external components for different applications.

The range over which the gain may be controlled will, in the example described be determined by the number of switchable resistors R1 to R3. As other possibilities, the switchable resistors may be replaced by a variable resistor having a resistance controllable by the controller 107, for example by using one or more field effect transistor as voltage controlled resistors controllable by the controller 107 to control the gain. Another possibility may be to use a variable transconductance amplifier as the amplifier in which case the gain may be controlled by a current or voltage signal from the controller 107.

Figure 3:
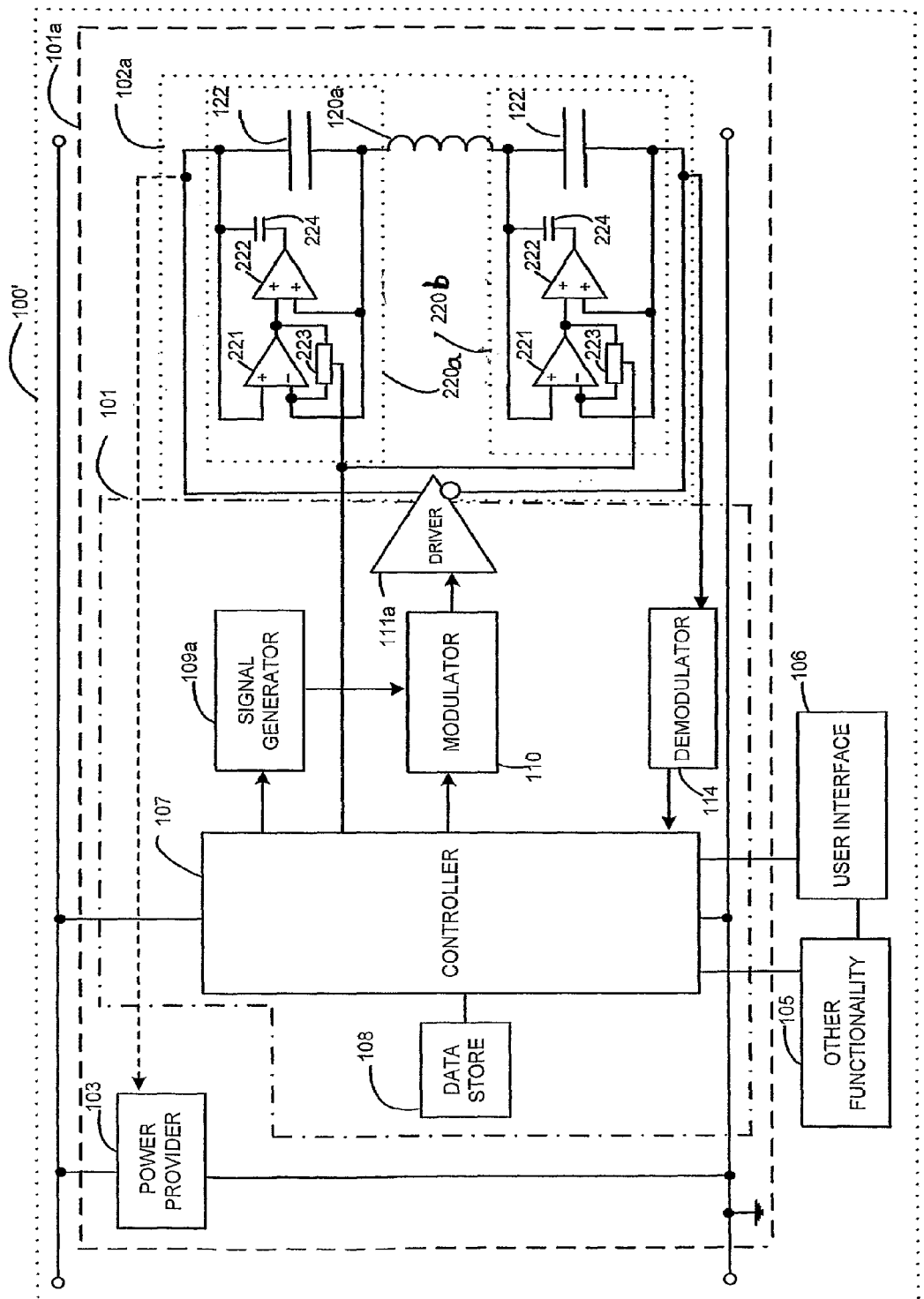
FIG. 3 shows a functional block diagram of a second example of an NFC communications enabled device embodying the invention having a coupler with a gain-controlled impedance element.

FIG. 3 shows a functional block diagram of an NFC communicator 100' that differs from the NFC communicator shown in FIG. 2 in that the signal generator 109a is operable to generate complementary RF signals by digital sine synthesis and the driver 111a is coupled to supply the respective complementary RF signals, after any modulation by the modulator 110 under the control of the controller 107, to respective terminals of a series tuned circuit forming the inductive coupler 102a. As shown the series tuned circuit 102a comprises a series connection of a first gain-controlled impedance element 220a, an antenna coil 120a and a second gain-controlled impedance element 220b.

In FIG. 3, the gain-controlled impedance elements 220a and 220b are, unlike the gain-controlled impedance element 200, not referenced to ground (earth) but are at a floating potential. Each of the gain-controlled impedances 220a and 220b has the same construction. Each of the gain-controlled impedance element 220a and 220b comprises a subtracting or differential amplifier 221 that has near-infinite input impedance and near-zero output impedance. The output of each of the subtracting amplifiers 221 is coupled to its negative input via a variable feedback element 223 and the controller 107 is configured to control the feedback of the variable feedback element 223 to control the gain K of the subtracting amplifier 221. Although not shown in FIG. 3, the variable feedback elements 223 may, as in FIG. 2, comprise a series of resistors each connectable between the input and output of the amplifier 201 via a corresponding switch having its control electrode coupled to a control output of the controller 107. The range over which the gain may be controlled will, in the example described be determined by the number of switchable resistors. As other possibilities, the switchable resistors may be replaced by a variable resistor having a resistance controllable by the controller 107, for example by using one or more field effect transistors as voltage controlled resistors controllable by the controller 107 to control the gain. Another possibility may be to use a variable transconductance amplifier as the amplifier in which case the gain may be controlled by a current or voltage signal from the controller 107.

In each of the gain-controlled impedances 220a and 220b, the output of the subtracting amplifier 221 is coupled to one input of an adding amplifier 222 that has near-infinite input impedances and near-zero output impedance and ideally affixed gain of unity or close thereto. The adding amplifier 222 has its output coupled to the positive input of the subtracting amplifier 221 via a capacitor 224 and the other input of the adding amplifier 222 is coupled to the negative input of the subtracting amplifier 222. A capacitor 122 is coupled across the inputs of the subtracting amplifier 221. One terminal of each capacitor 122 is coupled to a corresponding terminal of the antenna coil 120a while the other is coupled to the corresponding output of the driver 111a so that the capacitors 122 are in series with the antenna coil 120a and the remainder of each gain-controlled impedance provides a gain-controlled variable capacitance in parallel with the capacitor 122.

The controller 107 in FIG. 3 is coupled to control the variable feedback elements 223 so that the subtracting amplifier 221 of the first gain-controlled impedance 220a has the same gain as the subtracting amplifier 221 of the second gain-controlled impedance 220b.

Figure 6:
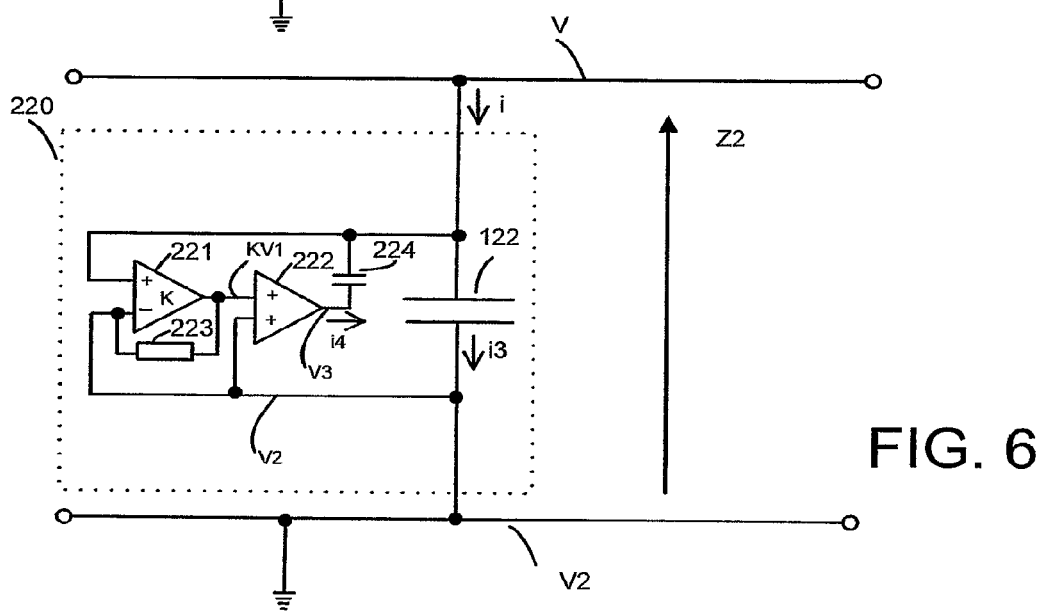
FIG. 6 shows a circuit diagram for explaining operation of the gain-controlled impedance elements shown in FIGS. 3 and 4.

The operation of the gain-controlled impedance elements 220a and 220b shown in FIG. 3 will now be described with the aid of the circuit diagram shown in FIG. 6 of one such gain-controlled impedance element 220. In FIG. 6, V is the alternating voltage across the gain-controlled impedance element 220, i is the current supplied to the gain-controlled impedance element 220, K is the gain of the subtracting amplifier 221, Z2 is the effective impedance of the gain-controlled impedance element 220 and the capacitances of the capacitors 224 and 122 are C4 and C3, respectively. The fact that the gain-controlled impedance is floating and not referenced to earth is illustrated in FIG. 6 by showing the gain-controlled impedance as being coupled between V1 and V2, rather than V and earth as in FIG. 5.

In accordance with Kirchoff's laws as above:

$$V3 = KV1 + V2 \qquad 11)$$

where KV1 is the alternating voltage at the output of the subtracting amplifier 221 and V3 is the alternating voltage at the output of the adding amplifier 222.

The current output from the adding amplifier 222 i4 is given:

$$i4 = (V3 - (V1 + V2))j\omega C4 \qquad 12)$$

substituting for V3 gives:

$$i4 = (KV1 + V2 - (V1 + V2))j\omega C4 \qquad 13)$$

which reduces to:

$$i4 = V1(K-1)j\omega C4 \qquad 14)$$

now by Kirchoff's law $$i + i4 = i3 \qquad 15)$$

where i is again the current input to the gain-controlled impedance 220 and i3 is the current through the capacitor 122

Substituting for i4 and i3 gives:

$$i + V1(K-1)j\omega C4 = V1 j\omega C3 \qquad 16)$$

rearranging in terms of i gives:

$$i = V1 j\omega C3 - V1(K-1)j\omega C4 \qquad 17)$$

$$i = V1(j\omega C3 - j\omega C4(K-1)) \qquad 18)$$

Now the impedance Z2 of the gain-controlled impedance element 220 is given by:

$$Z2 = V1/i = 1/(j\omega C3 - j\omega C4(K-1)) \qquad 19)$$

which becomes $$Z2 = 1/j\omega(C3 - (K-1)C4) \qquad 20)$$

Therefore the impedance Z2 of the gain-controlled impedance element 220 is purely capacitive and has the value:

$$Z2 = C3 - (K-1)C4 \qquad 21)$$

As can be seen by comparing equations 10 and 20, the impedance Z2 of the gain-controlled impedance element 220 varies with the gain K of the subtracting amplifier 221 in the same manner as the impedance Z1 of the gain-controlled impedance element 200 varies with the gain K of the amplifier 201.

Thus the effective capacitance of each gain-controlled impedance element 220a or 220b is controlled by the gain K of its subtracting amplifier 221 which in turn is controlled by the variable feedback element 223 which is controlled by the controller 107. Whether the effective capacitance is greater than or less than the capacitance C3 of capacitor 122 will depend upon whether K is less than or greater than 1.

In this example, the gains of the subtracting amplifiers 221 are set for the particular application for which the NFC communicator is to be used and for its expected magnetic environment by configuration of the controller 107 to control the variable feedback elements 223. The determination of the required gain for a particular application and magnetic environment may be achieved by testing the strength of the RF signal generated by a sample NFC communicator designed for that application within an environment that is the same as or mimics the environment within which the NFC communicator is to operate and causing the controller 107 of the sample NFC communicator to adjust the gain by selecting resistors of the variable feedback element 223 until the required RF signal strength is achieved. This enables the gain to be set relatively easily even for an NFC communicator that forms part of a host device, whether the NFC communicator is a discrete entity within the host device or is provided integrated in the functionality of the host device. The gain may be set during manufacture or during operation of the device.

As will be appreciated, the use of the gain-controlled impedance elements again enables an NFC communicator to be adapted to the magnetic environment within which it is to operate so as to obtain the required RF signal strength without the need to change a mask stage of an integrated circuit manufacturing process, or to incorporate external components, or to select different value external components.

Figure 4:
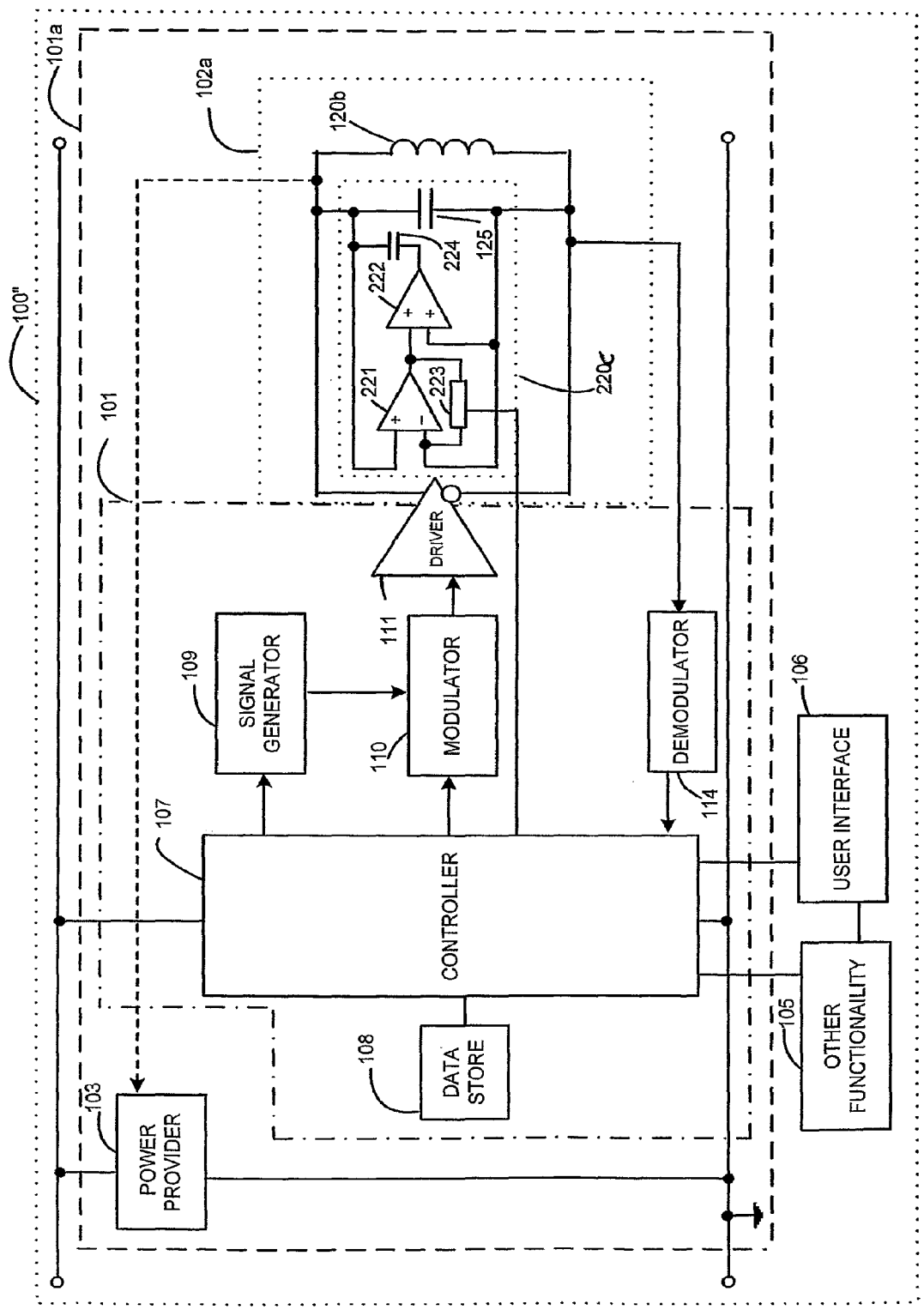
FIG. 4 shows a functional block diagram of a third example of an NFC communications enabled device embodying the invention having a coupler with a gain-controlled impedance element.

FIG. 4 shows a functional block diagram of another example of an NFC communicator 100" embodying the invention which differs from that shown in FIG. 3 in that the inductive coupler 102a comprises a parallel tuned circuit comprising a gain-controlled impedance 220c coupled in parallel with or across an antenna coil 120b. The gain-controlled impedance 220c is functionally identical to one of the gain-controlled impedances shown in FIG. 3 and functions in the same manner.

Figure 7:
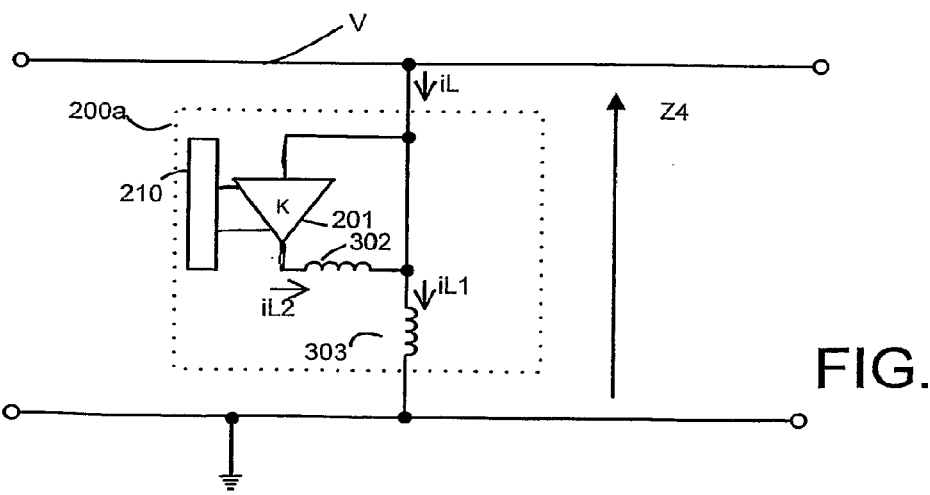
FIG. 7 shows a circuit diagram of a gain-controlled impedance element that may replace the gain-controlled impedance shown in FIG. 2.

As shown in FIGS. 2 to 6, the gain-controlled impedances are gain-controlled capacitances. The gain-controlled impedances may however alternatively be inductances. To illustrate this, FIG. 7 shows a circuit diagram for explaining operation of a gain-controlled impedance 200a which differs from that shown in FIGS. 2 and 5 in that the capacitors 202 and 203 are replaced by inductors 302 and 303. In FIG. 7, iL is the current supplied to the gain-controlled impedance element 200a, iL2 is the current output of the amplifier 201, iL1 is the current through the inductor 303, K is the gain of the amplifier 201, Z4 is the effective impedance of the gain-controlled impedance element 200a and the inductances of the inductors 302 and 303 are L2 and L1, respectively.

Following the arguments set out above in relation to equations 1 to 10 above:

$$iL+(K-1)V4/j\omega L2=V4/j\omega L1 \quad (22)$$

$$iL=V4/j\omega L1-(K-1)V4/j\omega L2 \quad (23)$$

$$iL=V4(1/j\omega L1-(K-1)/j\omega L2) \quad (24)$$

$$Z4=1/(1/j\omega L1-(K-1)/j\omega L2) \quad (25)$$

$$Z4=j\omega/(1/L1-(K-1)/L2) \quad (26)$$

Thus, the effective inductance of the gain-controlled impedance element 200a shown in FIG. 7 is controlled by the gain K of the amplifier 201 which is in turn controlled by the variable feedback element 210 which is controlled by the controller 107. Whether the effective inductance is greater than or less than the inductance L1 of the inductor 303 will depend upon whether K is less than or greater than 1.

It will, of course, be appreciated that the gain-controlled impedances 220a, 220b and 220c described above with reference to FIGS. 3, 4 and 6 may be similarly modified by replacing the capacitors with inductors. Also, the gain-controlled impedance shown in FIG. 2 may be used in FIGS. 3 and 4 and vice versa. Also, a gain-controlled impedance may have both capacitive and inductive elements that are gain-controllable.

The description above makes the assumption that alternating voltages within the circuits are sinusoidal. However, as any signal waveform can be described as being made-up from a plurality of sinusoids, once the case is shown for sinusoidal waveforms, then it will be true for any waveform.

Figure 8:
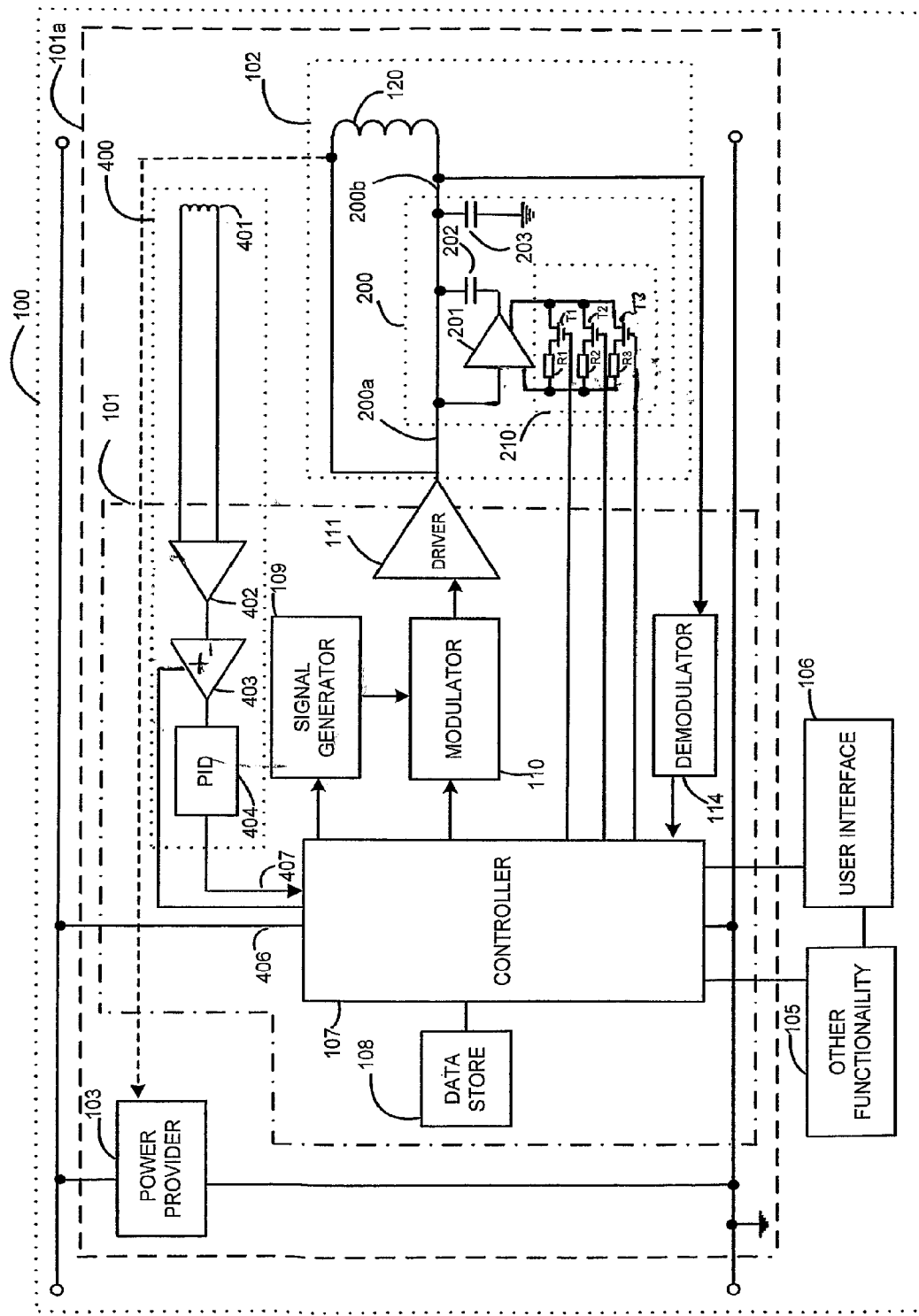
FIG. 8 shows a functional block diagram of another example of an NFC communications enabled device embodying the invention having a coupler with gain-controlled impedance element.

As so far described, the gain required to achieve the required magnetic field strength for a particular application may be determined by sensing the strength of the magnetic field generated by the inductive coupler during testing of a sample NFC communicator or host device comprising an NFC communicator or NFC functionality in an environment which is the same as or mimics the environment within which the NFC communicator or host device will be used in the particular application for which the NFC communicator or host device is intended, and then causing the controller 107 to adjust the gain until the required magnetic field strength is achieved. As another possibility, the gain may be adjusted automatically during operation of an NFC communicator or host device comprising an NFC communicator or NFC functionality to achieve the required magnetic field strength by modifying any of the NFC communicators shown in FIGS. 2 to 5 to incorporate a magnetic field strength controller, as proposed in International Patent Application No. PCT/GB2005/004407, the whole contents of which are hereby incorporated by reference. FIG. 8 shows the NFC communicator shown in FIG. 2 modified to include such a magnetic field strength controller 400. Similar modifications may be made to the NFC communicators shown in FIGS. 3 and 4.

As shown in FIG. 8, the magnetic field strength controller 400 comprises a sense coil 401 positioned so as to be able to sense or detect at least part of the magnetic field (H field) produced by the antenna circuit coil 120. As shown in FIG. 8, the sense coil 401 does not form part of a resonant circuit. The sense coil 401 may however form part of a resonant sense coil circuit similar to the antenna circuit 102.

FIG. 8 shows the sense coil 401 as being adjacent to the main antenna coil 120. The sense coil needs to be placed partially or completely within the H field generated by the antenna circuit 102 and, in order to sense the magnetic field generated by the antenna circuit, at least part of the sense coil should be parallel to that magnetic field or to a component of that magnetic field. The sense coil should ideally be placed co-axially with the antenna coil, for example it may be formed inside the antenna circuit 102 or above or below the antenna circuit 102. Although FIG. 8 shows a single sense coil, multiple sense coils may be placed in series around the antenna coil 120, above or below the antenna coil 120 or within the antenna circuit 102. The maximum distance between the two coils will be determined by the properties of the antenna circuit 102 and extent of the H-field which is generated by such an antenna circuit. The positioning of the sense coil 401 may, however, vary from NFC communicator to NFC communicator and will, for example, depend on both the lay-out of the NFC communicator and the environment within which the NFC communicator is intended to operate.

The sense coil 401 is coupled to a sense amplifier 402 for amplifying and filtering the signal supplied by the sense coil 401. The sense amplifier 402 has an output coupled to one input (as shown the negative input) of a differential or error amplifier 403. The other input of the error amplifier 403 is coupled to a required magnetic field strength output 406 of the controller 107 which provides a reference signal indicating the magnetic field strength required to be produced by the antenna circuit 102. The type of reference signal provided by the controller 107 on the required magnetic field strength output 406 will depend upon the nature of the error amplifier. Thus, for example, the reference signal may be a comparison or threshold voltage, or a comparison or threshold current. In each case, the error amplifier 403 is operable to produce a signal dependent on its evaluation of the difference between the signal received by the sense coil 401 and the reference signal on the required magnetic field strength output 406 from the controller 107.

The operation of the sense amplifier 402 will depend upon the operation of the controller 107 and the NFC communicator. For example, where the signal received by the sense coil 401 is modulated, then the sense amplifier 402 may filter out that modulation. As another possibility, the NFC communicator controller 107 may be configured to respond to signals from the magnetic field strength controller 400 only when there is no modulation. As another possibility, the controller circuit 17 may track any modulation and the processing techniques may be adjusted to ensure that any such modulation does not affect the control signals provided by the magnetic field strength controller 400. As another possibility, the NFC communicator may be designed such that the magnetic field strength controller 400 is only operable at certain times or for certain periods, for example when an un-modulated magnetic field is generated at antenna circuit coil 120. Thus, for example, the controller 107 may only activate the magnetic field strength controller 400 when the magnetic field is un-modulated.

The output of the error amplifier 403 is supplied to a control loop stabiliser 404 (identified as PID in FIG. 8) to produce a signal which can be used by the controller 2 to control the magnetic field strength at the antenna 120. The processing technique used by the control loop stabiliser 404 will depend on the complexity required and processing power available. The control loop stabiliser 404 may be implemented entirely in software or using analogue circuitry or a combination of both. FIG. 8 shows the control loop stabiliser 404 as a functional block separate from the controller 107. In such a case, the control loop stabiliser 404 functionality may be provided by, for example, a processor or an operational amplifier. As another possibility, the signal processing functionality may be provided by the controller 107.

In the example illustrated by FIG. 8, the control loop stabiliser 404 (or the signal processing functionality provided by the controller 107) is configured to implement PID (proportional, integral, derivative) techniques. The output from the error amplifier 403 is thus processed by the control loop stabiliser 404 to produce three signals: a proportional (that is unprocessed) signal, an integrated signal (that is the integral signal) and a differentiated signal (that is the derivative signal) These three signals are combined to produce an output control signal representing any adjustment required. A constant may also be applied to each of the P, I and D signals providing variable effect on the end combined signal.

As described above, a single error amplifier 403 is provided. As another possibility, the error amplifier 403 may be replaced by multiple operational amplifiers each coupled to receive the output from the sense amplifier 402. In such an example, each of the operational amplifiers will be configured to generate a respective one of the proportional signal, the integral signal and the derivative signal and the control loop stabiliser 404 will be configured to combine the outputs of these operational amplifiers, after multiplication by appropriate constants.

Any appropriate algorithm may be used to implement the PID processing. An example algorithm can be represented as follows:

$$\text{Output}(t) = PE(t) + 1/I\!\!\int\! E(t)dt + Dd/dtE(t)$$

Where t=time, E is the received RF signal strength or output from the sense amplifier, P is the proportional error, I is the integral of the error and D is the derivative of the error. Constants may be used to determine the effect that each of the three inputs (P, D and I) has on the combined comparison and therefore on the control of the RF signal being generated.

The proportional error P is used for basic control loop speed and stability. The integral I of the error is usually used to represent the sum of previous errors within a given timescale and therefore has an averaging effect. The derivative D of the error is used to speed up control loop stabilisation, and can be used to identify where there are large or rapid changes in the RF signal strength being generated.

The control loop stabiliser 404 need not necessarily use PID techniques. Other possibilities include the use of pre-set software algorithms or fuzzy logic. Cascades of PID techniques can also be used.

The output of the control loop stabiliser 404 is coupled to a correction signal input 407 of the controller 107 to enable the controller 107 to control the variable feedback element 210 to vary the gain of the amplifier 201 until the correction signal input 407 indicates that the required magnetic field strength has been achieved.

In operation of the NFC communicator, the controller 107 controls the signal generator 109, modulator 110 and driver 111 to effect generation of the RF signal as required and to effect any required modulation of that RF signal. When the controller 107 causes the signal generator 109 to generate an RF signal when the NFC communicator is in initiator mode, the resulting oscillating magnetic H field produced by the antenna circuit 102 is inductively coupled to the antenna circuit of any NFC communicator in target mode or RFID tag or transponder within the H field (that is within range) of the NFC communicator. The resulting magnetic field (H field) will be sensed by the sense antenna coil 401.

The magnetic field sensed by the sense antenna coil 401 will be the magnetic field resulting from the actual RF signal supplied to the antenna circuit 102 and the antenna circuit configuration as modified by the effect of metallic and/or magnetic material and conductive loops in proximity to the antenna circuit 102, that is as modified by the effect of the "electromagnetic environment" of the NFC communicator. This electromagnetic environment may include contributions from a housing or casing or a host device of the NFC communicator and/or the device with which it is communicating, from other devices, apparatus or objects in the vicinity or from any combination of the foregoing.

The RF signal resulting from the magnetic field sensed by the sense coil 401 is fed to the sense amplifier 402 which amplifies and filters the signal to produce a sense signal which is proportional to the voltage or current of the received RF signal. The error amplifier 403 compares the sense signal with a reference signal output by the controller 107 on the required magnetic field strength output 406. This reference signal represents the ideal signal strength/incident magnetic field strength required from the antenna circuit 102 and is pre-set and stored by the controller 107. The error amplifier 403 generates a difference signal which is then processed by the control loop stabiliser 404 (or the controller 107 where the functionality of the control loop stabiliser is provided by the controller 107) in the manner described above to produce a RF signal control signal which is supplied to the correction signal input 407 of the controller 107.

The RF signal control signal indicates to the controller 107 whether the sensed magnetic field is higher or lower than the required magnetic field. The controller 107 is configured to control the gain of the gain-controlled impedance 200 of the antenna circuit 102 in the manner described above until the controller 107 determines that RF signal control signal indicates that the required magnetic field strength has been achieved. As another possibility, the PID techniques may be selected so as only to produce an RF signal control signal 407 to cause the controller 107 to adjust the gain of the gain-controlled impedance when the received signal strength at sense coil 401 is lower than a desired field strength or threshold voltage.

Appropriate ones of the modifications described in PCT/GB2005/004407 may be used. For example, the reference signal representing the required magnetic field strength may be stored within the error amplifier. Also, the output of the control loop stabiliser 404 may provide a control signal for a controller separate from the controller 107 and specifically provided to control the gain of the gain-controlled impedance in accordance with the sensed magnetic field. As set out above, the NFC communicator controller 107 may be configured to respond to signals from the magnetic field strength controller 400 only when there is no modulation or the magnetic field strength controller 400 may be configured, under the control of the controller 107, to filter out any modulation so as to inhibit signal modulation affecting the magnetic field strength determination. The modulation filtering may be carried out anywhere in the magnetic field strength controller 400 before the control loop stabiliser. For example a separate filter may be provided or the error amplifier 403 may incorporate an initial filtering stage. As another possibility, there may be no filtering out of the modulation but rather the control loop stabiliser 404 (or controller 107 where the signal processing functionality is provided by the controller) may be configured to track modulation, during a magnetic field strength determination, ignore any modulation effected by the NFC communicator itself and when an error signal consistent with external modulation of the magnetic field arises supply the modulated RF signal to the demodulator 15 for demodulation and data retrieval in the manner shown in FIG. 4 of PCT/GB2005/004407.

The control loop stabilising functionality described above with reference to FIG. 8 may be operable whenever a magnetic field is being generated by a near field communicator. Alternatively the control loop stabilising functionality may be activated by the controller 107. For example where near field communicators are to be tuned for different applications, for example for use inn different host devices, the control stabilising functionality may be turned on as part of the testing and programming process and then disabled thereafter. Alternatively the control loop stabilising functionality may only be turned on where a non-modulated RF signal is transmitted by a near field communicator. The operation of the near field communicator may be adjusted to provide for a preliminary transmission of an un-modulated field to enable the control loop to adjust operation prior to any modulation being carried out.

It will, of course, be appreciated that the functional block diagrams shown in FIGS. 2 to 4 would apply equally to a standalone NFC communicator, in which case the other functionality 105 and possibly the user interface 106 may be omitted.

The components of the NFC communicators described above, apart from the power provider and the antenna coil 120 and sense coil 401, if present, may be provided by a single semiconductor integrated circuit chip or by several separate chips, for example one or more silicon integrated circuits, or discrete devices mounted on a printed circuit board. Whether particular functions are implemented by analogue or digital circuitry will depend on the design route chosen. For example, error detection and feedback circuitry may be implemented in either the analogue or digital domain Antennas will be constructed in a form suitable for system and circuit requirements and may, as described above, be coils or could be dipoles or any other suitable form of antenna.

An NFC communicator or NFC communications enabled device as described above may operate in an initiator or a target mode so that when in initiator mode in which it acts as an initiator of communication with a target compatible near field RF communicator or near field RF communications enabled device and when in target mode it acts as a target for an initiator near field RF communicator or near field RF communications enabled device. The mode may be determined by the controller 107 or may be determined in dependence on the nature of a received near field RF signal. As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. Communication may be in accordance with an active protocol under which the initiator and target each generate their own RF field when communicating data and then turn off that RF field to await data communication from the other or in accordance with a passive protocol under which the initiator transmits and maintains its RF field throughout the entire communication.

As will be appreciated from the above, the controller 107 of an NFC communicator or NFC communications enabled device embodying the invention is operable to control the NFC communications process to, for example, ensure that the NFC communicator operates in compliance with the appropriate communications protocol(s) and to control the timing (using its own clock where appropriate), manner and mode of operation of the NFC communicator. The controller 107 is also operable to control communication with any host device, where required. Depending upon the circumstances, a change in functionality of the NFC communicator or of any host device may arise as a result of communication with another NFC communications enabled device. Alternatively communication may result in a change to the data stored in either one or both of the data store 108 and controller 107.

The functionality of the controller 107 is shown in FIGS. 2 to 4 as being entirely within the NFC communicator. As other possibilities, the functionality of the controller 107 may be entirely within any host device controller or distributed between the NFC communicator and the host device. As a further possibility, certain control functionality may reside within a separate unit which is attachable or removable or alternatively only used for certain transactions, for example a security device or ESD device which may only be used for payment transactions. Where the functionality of the controller 107 is within a separate unit or within any host device, then instead of the controller 107 the NFC communicator will have a coupling, possibly including an appropriate interface, to that controller.

As shown in FIG. 2, the data store 108 comprises a memory within the NFC communicator. As another possibility, the data store 108 may be comprised within any host device or shared or co-located memory device or data storage means. For example the data store may reside within the host device and all data may be centrally held within such host device. Alternatively data may be stored both within the NFC communicator (for example data relevant to operation of the NFC functionality) and within a memory (not shown) within the host device (for example data relevant to the operation characteristics of the host device). The data storage means may be read only or may be read/write, depending upon whether data is to be written to as well as read from the data store.

As described above, the gain-controlled impedance element is part of the antenna circuit or inductive coupler. As other possibilities or additionally, any other impedance within the NFC communicator that may need to be adjustable may be such a controlled gain impedance element, for example an impedance of the signal generator, the modulator or the demodulator, and the controller may be s operable to control such gain-controlled impedance element (s).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A communications device, comprising:
    an inductive coupler configured to couple inductively with a magnetic field of a radio frequency signal;
    a feedback circuit including a controlled impedance, the feedback circuit being associated with the inductive coupler: and
    a controller configured to adjust the controlled impedance to control a magnetic field strength of the magnetic field of the radio frequency signal.

2. The communications device of claim 1, wherein the inductive coupler comprises:
    an antenna coil configured and arranged in series with the controlled impedance.

3. The communications device of claim 1, wherein the feedback circuit comprises:
    an amplifier having an input coupled to a first connection of the controlled impedance and an output coupled to a second connection of the controlled impedance; and
    a variable feedback element coupled between the input of the amplifier and the output of the amplifier.

4. The communications device of claim 3, wherein the feedback circuit further comprises:
a first capacitance coupled between the output of the amplifier and the second connection of the controlled impedance; and
a second capacitance coupled between the second connection of the controlled impedance and a ground.

5. The communications device of claim 4, wherein the controller is configured to vary the first capacitance, the second capacitance, or a gain associated with the amplifier to control the controlled impedance.

6. The communications device of claim 4, wherein the controlled impedance is denoted as:

$$Z_1 = C_1 - (K-1)C_2,$$

where $Z_1$ represents the controlled impedance, $C_1$ represents the second capacitance, $C_2$ represents the first capacitance, and K represents a gain of the amplifier.

7. The communications device of claim 3, wherein the variable feedback element comprises:
a plurality of impedances coupled to a corresponding switch from among a plurality of switches, each of the plurality of switches being controlled by the controller.

8. The communications device of claim 7, wherein the plurality of impedances are associated with active components or with passive components.

9. The communications device of claim 7, wherein the controller is configured to adjust a gain associated with the controlled impedance by controlling the plurality of switches to control the magnetic field strength of the magnetic field.

10. The communications device of claim 1, further comprising:
a magnetic field strength controller configured to sense the magnetic field to provide a correction signal input, wherein
the controller is further configured to adjust the controlled impedance to control the magnetic field strength of the magnetic field according to the correction signal input.

11. The communications device of claim 10, wherein the magnetic field strength controller comprises:
a sense circuit configured to sense the magnetic field to provide a sensed magnetic field;
an error circuit configured to compare the sensed magnetic field and a reference signal to provide an error signal, the reference signal being associated with a desired magnetic field strength; and
a stabilizer circuit configured to operate upon the error signal to provide the correction input signal.

12. The communications device of claim 11, wherein the controller is further configured to adjust the controlled impedance until the required magnetic field strength has been achieved.

13. The communications device of claim 1, wherein the controller is configured to dynamically control the controlled impedance.

14. The communications device of claim 13, wherein the controller is configured to vary the controlled impedance continuously to achieve a desired magnetic field strength.

15. The communications device of claim 13, further comprising:
a sense circuit configured to sense the magnetic field,
wherein the controller is configured to dynamically vary the controlled impedance based on feedback information provided by the sense circuit.

16. The communications device of claim 13, wherein the controller is configured to vary the controlled impedance at a given time to control the magnetic field strength.

17. The communications device of claim 16, wherein the given time occurs when a protocol associated with the communications device changes.

18. The communications device of claim 17, wherein the protocol includes International Organization for Standardization (ISO) 18092, ISO 21481, ISO 14443, or ISO 15693.

19. The communications device of claim 1, wherein the controller is configured to vary the controlled impedance based on user input.

20. The communications device of claim 1, wherein the controller is configured to vary the controlled impedance upon start-up of the device.

21. The communications device according to claim 1, further comprising:
a modulator, coupled to the inductive coupler, configured to modulate data to provide the radio frequency signal, wherein the modulator modulates the data according to frequency shift key modulation, phase shift key modulation, pulse density modulation, amplitude modulation, or load modulation.

22. A method for controlling an impedance in a communications device, comprising:
coupling an inductive coupler with a magnetic field, the inductive coupler being associated with a feedback circuit including a controlled impedance; and
adjusting the controlled impedance to control a magnetic field strength of the magnetic field.

23. The method of claim 22, wherein the controlled impedance is denoted as:

$$Z_1 = C_1 - (K-1)C_2,$$

where $Z_1$ represents the controlled impedance, $C_1$ represents a second capacitance, $C_2$ represents a first capacitance, and K represents a gain of amplification.

24. The method of claim 23, wherein the adjusting comprises:
varying the first capacitance, the second capacitance, or the gain associated with the amplification to control the controlled impedance.

25. The method of claim 22, wherein the adjusting comprises:
switching a plurality of impedances to adjust the controlled impedance to control the magnetic field strength.

26. The method of claim 25, wherein the plurality of impedances is associated with active components or with passive components.

27. The method of claim 22, further comprising:
sensing the magnetic field to provide a correction signal input,
wherein the adjusting comprises:
adjusting the controlled impedance based on the correction signal input to control the magnetic field strength.

28. The method of claim 27, wherein the sensing comprises:
comparing a signal associated with the sensed magnetic field to a reference signal associated with a desired magnetic field strength; and
providing the correction input signal based on a result of the comparing.

29. The method of claim 22, wherein the adjusting comprises:
dynamically adjusting the controlled impedance to control the magnetic field strength.

30. The method of claim 29, wherein the adjusting the controlled impedance comprises:
continuously varying the controlled impedance to achieve a desired magnetic field strength.

31. The method of claim 30, wherein the continuously varying comprises:
dynamically varying the controlled impedance based on feedback information that is provided by sensing the magnetic field.

32. The method of claim 29, wherein the dynamically adjusting the controlled impedance comprises:
dynamically varying the controlled impedance at a given time to control the magnetic field strength.

33. The method of claim 32, wherein the given time occurs when a communication protocol associated with the magnetic field changes.

34. The method of claim 33, wherein the protocol includes International Organization for Standardization (ISO) 18092, ISO 21481, ISO 14443, or ISO 15693.

35. The method of claim 22, wherein the adjusting comprises:
varying the controlled impedance based on user input.

36. The method of claim 22, wherein the adjusting comprises:
varying the controlled impedance upon a start-up of the communication device.

37. The method of claim 22, further comprising:
modulating data to provide a radio frequency signal associated with the magnetic field, the modulating data including modulating data according to frequency shift key modulation, phase shift key modulation, pulse density modulation, amplitude modulation, or load modulation.

* * * * *